(12) United States Patent
Blankenship

(10) Patent No.: US 12,344,104 B2
(45) Date of Patent: Jul. 1, 2025

(54) ELECTRIC VEHICLE SYSTEMS AND METHODS

(71) Applicant: BATTELLE MEMORIAL INSTITUTE, Columbus, OH (US)

(72) Inventor: Joshua Blankenship, Centerburg, OH (US)

(73) Assignee: Battelle Memorial Institute, Columbus, OH (US)

( * ) Notice: Subject to any disclaimer, the term of this patent is extended or adjusted under 35 U.S.C. 154(b) by 20 days.

(21) Appl. No.: 17/464,073

(22) Filed: Sep. 1, 2021

(65) Prior Publication Data

US 2022/0063424 A1  Mar. 3, 2022

Related U.S. Application Data

(60) Provisional application No. 63/073,390, filed on Sep. 1, 2020.

(51) Int. Cl.
| | |
|---|---|
| *B60L 50/61* | (2019.01) |
| *B60K 6/46* | (2007.10) |
| *B60W 10/06* | (2006.01) |
| *B60W 10/08* | (2006.01) |
| *B60W 20/13* | (2016.01) |
| *B60W 10/26* | (2006.01) |

(52) U.S. Cl.
CPC ............... *B60L 50/61* (2019.02); *B60K 6/46* (2013.01); *B60W 10/06* (2013.01); *B60W 10/08* (2013.01); *B60W 20/13* (2016.01); *B60L 2200/46* (2013.01); *B60W 10/26* (2013.01); *B60W 2540/10* (2013.01); *B60W 2710/0605* (2013.01); *B60W 2710/0644* (2013.01); *B60Y 2200/43* (2013.01)

(58) Field of Classification Search
CPC ...... B60K 6/46; B60K 17/354; B60K 17/356; B60K 2001/001; B60K 1/04; B60W 10/06; B60W 10/08; B60W 20/13; B60L 2200/46
See application file for complete search history.

(56) References Cited

U.S. PATENT DOCUMENTS

| | | | | |
|---|---|---|---|---|
| 873,711 | A * | 12/1907 | Bruen ................ | B60B 35/109 280/37 |
| 3,966,220 | A * | 6/1976 | Forsyth .............. | B62D 31/006 280/771 |

(Continued)

*Primary Examiner* — Carl C Staubach
(74) *Attorney, Agent, or Firm* — Grossman, Tucker, Perreault & Pfleger, PLLC; Donald G. Weiss

(57) ABSTRACT

The present disclosure is directed to electric vehicles. A modular electric vehicle includes an electric vehicle chassis that includes an energy storage device, chassis control circuitry, and one or more communication interfaces disposed on an upper surface of the chassis. The chassis further includes an electric motor, suspension and drivetrain to provide an operating vehicle. An electric vehicle includes an internal combustion engine that drives an electric drive motor for charging a vehicle battery The vehicle may be driven solely by electric power, i.e., the internal combustion engine may provide no drive power to the axles of the vehicle and is used primarily for charging the battery. In some embodiments, electric motors may be coupled to one or both of the vehicle axles and the battery may be coupled to one or both the drive motors under control of a controller.

25 Claims, 5 Drawing Sheets

(56) References Cited

U.S. PATENT DOCUMENTS

| | | | | |
|---|---|---|---|---|
| 5,042,831 A | * | 8/1991 | Kuhns | B62D 21/14 280/786 |
| 5,934,397 A | * | 8/1999 | Schaper | B62D 63/025 180/65.245 |
| 6,374,934 B1 | * | 4/2002 | Beck | B62D 63/02 180/908 |
| 6,896,319 B1 | * | 5/2005 | Huang | B62D 25/02 296/193.06 |
| 6,969,104 B2 | * | 11/2005 | Green | B62D 53/067 296/184.1 |
| 7,628,413 B2 | * | 12/2009 | Gallipoli | A63C 17/01 280/786 |
| 7,950,686 B2 | * | 5/2011 | Wang | B62K 5/007 280/491.4 |
| 8,540,272 B1 | * | 9/2013 | Vitale | B62D 47/003 280/638 |
| 10,086,891 B2 | * | 10/2018 | Hung | B60L 50/60 |
| 10,363,979 B2 | * | 7/2019 | Haug | B62D 25/2018 |
| 10,870,341 B2 | * | 12/2020 | Hung | B60S 9/14 |
| 2003/0046802 A1 | * | 3/2003 | Chernoff | B60K 15/07 29/428 |
| 2012/0101703 A1 | * | 4/2012 | Morita | B60T 8/58 701/70 |
| 2012/0139292 A1 | * | 6/2012 | Hofer | B62D 65/04 296/181.1 |
| 2013/0161104 A1 | * | 6/2013 | Akamatsu | B60L 50/66 180/65.51 |
| 2014/0008897 A1 | * | 1/2014 | Tsukerman | B62D 21/14 280/657 |
| 2016/0129958 A1 | * | 5/2016 | Byrnes | B60L 15/32 180/12 |
| 2016/0207418 A1 | * | 7/2016 | Bergstrom | B60G 3/08 |
| 2016/0257360 A1 | * | 9/2016 | Mackenzie | B62D 63/025 |
| 2020/0001716 A1 | * | 1/2020 | Takano | B62D 5/0463 |
| 2020/0369140 A1 | * | 11/2020 | McCarron | B60G 7/001 |
| 2022/0194489 A1 | * | 6/2022 | Roche | B60K 1/00 |
| 2022/0355636 A1 | * | 11/2022 | Harmon | B62D 63/025 |

* cited by examiner

ELECTRIC VEHICLE SYSTEMS AND METHODS

CROSS-REFERENCE TO RELATED APPLICATIONS

The present application claims the benefit of the filing date of U.S. Provisional Application Ser. No. 63/073,390, filed Sep. 1, 2020, the entire teachings of which application is hereby incorporated herein by reference.

TECHNICAL FIELD

The present disclosure relates to electric vehicles, more specifically to a electric vehicle systems and methods.

BACKGROUND

Electric vehicles store energy for driving the vehicle in one or more energy storage devices such as a rechargeable battery, ultracapacitor, or supercapacitor. Such energy storage device(s) are typically placed inside a sealed vessel to protect the energy storage devices from damage and also to provide a controlled environment that maximizes power delivery and charge cycles of the energy storage device. The sealed vessel containing the energy storage device(s) typically forms all or a portion of the vehicle chassis, supporting the front and rear suspension and electric drive motors for driving the vehicle axle(s). Such an arrangement may be referred to as a "skateboard" configuration given the relatively flat profile of the sealed vessel containing the energy storage devices.

Also, the distance an electric vehicle can travel using power provided by an energy storage device is limited by the storage capacity of the energy storage device. To provide increased range for the vehicle, it is known to provide a hybrid electric vehicle configuration wherein an internal combustion engine (ICE) is used for driving the vehicle during portions of the operating time and the energy storage device is used for driving the vehicle during other portions of the vehicle operating time.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

In some embodiments, electric vehicle conversion systems consistent with the present disclosure beneficially and advantageously permit the rapid operable coupling and decoupling of a vehicle body to an electric vehicle chassis. The electric vehicle chassis may be a platform style chassis that includes a drivetrain, one or more energy storage devices, one or more electric motors operably coupled to the drivetrain, and one or more communication interfaces. In addition, the electric vehicle chassis may include a number of attachment features to permit the physical and operable coupling of the electric vehicle chassis to a vehicle body. The electric vehicle chassis may include one or more interfaces that communicably couple controls, such as steering, braking, HVAC, head unit, etc., disposed in the vehicle body to the appropriate systems included in the electric vehicle chassis. The electric vehicle chassis may include a displaceable front subframe and/or a displaceable rear subframe to permit the chassis to adapt to a vehicle body having any wheelbase. In addition, the electric vehicle chassis may include a variable width front drivetrain and/or a variable width rear drivetrain such that the track width of the chassis may be adjusted based on the width of the vehicle body coupled to the chassis.

In addition, in some embodiments the electric vehicle chassis includes at least one chassis control system to monitor and/or adjust the control inputs received from the vehicle body and monitor and/or adjust the control outputs generated by the electric vehicle chassis and communicated to the vehicle body. The chassis control system may include logic, applications, programming, or routines that determine a type of vehicle body (truck, SUV, car, sports car, etc.) physically coupled to the electric vehicle chassis and may alter or adjust one or more electric vehicle chassis parameters based on the type of vehicle body coupled to the electric vehicle chassis. For example, suspension and braking parameters used when a sports car body is coupled to the chassis may differ from the suspension and braking parameters used when a hi-cube cargo van body is coupled to the chassis.

In some embodiments, an electric vehicle consistent with the present disclosure includes an internal combustion engine that drives an electric drive motor for charging a vehicle battery.

Figure 1:
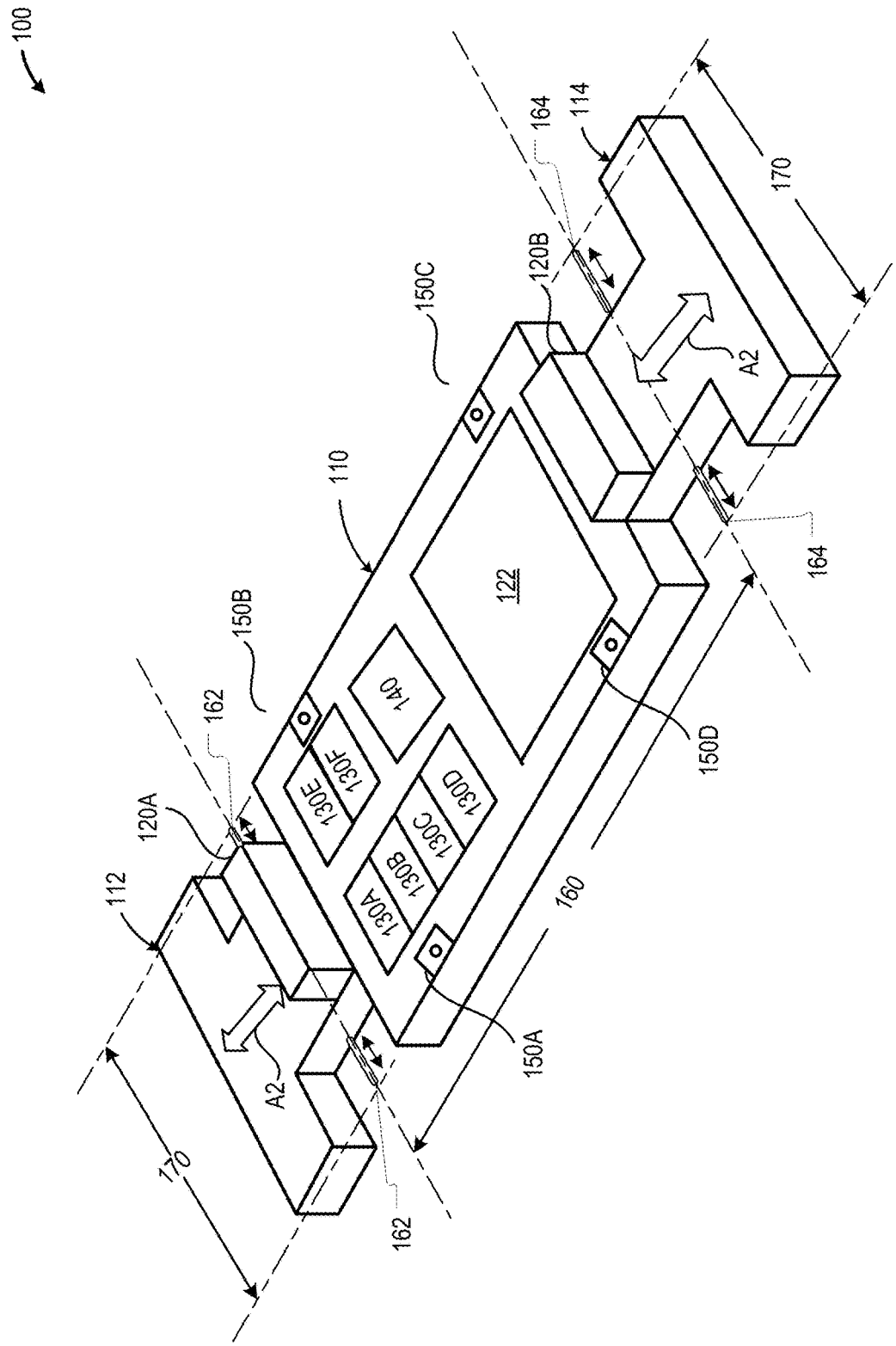
FIG. 1 is a top perspective view depicting an example electric vehicle chassis that includes a central chassis member, an adjustable front subframe, an adjustable rear subframe, one or more energy storage devices, one or more interfaces, and system control circuitry, in accordance with at least one embodiment described herein.

The vehicle may be driven solely by electric power, i.e., the internal combustion engine may provide no drive power to the axles of the vehicle and is used primarily for charging the battery. In some embodiments, electric motors may be coupled to one or both of the vehicle axles and the battery may be coupled to one or both the drive motors under control of a controller. The controller may be configured to provide a variety of beneficial functions. For example, the controller may be configured to provide an output to the internal combustion engine for increasing the revolutions per minute (RPM) of the internal combustion engine, even though the internal combustion engine does not provide drive power for the vehicle. This allows the electrically driven vehicle to simulate an internal combustion engine-driven vehicle FIG. 1 is a top perspective view depicting an example electric vehicle chassis 100 that includes a central chassis member 110, an adjustable front subframe 112, an adjustable rear subframe 114, at least one energy storage device 122, one or more interfaces 130A-130n (collectively, "interfaces 130"), and system control circuitry 140, in accordance with at least one embodiment described herein. In the illustrated example 100, the front subframe 112 is configured to support a front axle 162 for rotation relative thereto and the rear subframe 114 is configured to support a rear axle for rotation relative thereto. As is known, the front 162 and rear 164 axles may support wheels (not shown), e.g., with tires mounted thereon, at the ends thereof for supporting the vehicle for rolling movement on a surface. The front 162 and rear 164 axles may be of unitary construction so that the wheels thereon rotate in unison or may be separated into separate left and right axles, e.g., coupled to a vehicle differential, that rotate independently from each other. The front 162 and/or rear 164 axles may have a variable width to provide a variable track width 170 for the vehicle chassis 100.

As depicted in FIG. 1, the electric vehicle chassis 100 has a wheelbase 160 measured from the center of the front axle 162 to the center of the rear axle 164. In embodiments, the wheelbase 160 of the electric vehicle chassis 100 may be a fixed value (e.g., 105 inches). In other embodiments, the electric vehicle chassis 100 may include a slidably adjustable front subframe 112 and/or a slidably adjustable rear subframe 114 to provide an electric vehicle chassis 100 having a continuously variable wheelbase 160 (e.g., 100 to 120 inches). In embodiments, the front subframe 112 and/or the rear subframe 114 may be slidably adjustable along the longitudinal axis of the electric vehicle chassis 100, e.g., in the direction of arrows A1 and A2, respectively. In such instances, the front 112 and/or the rear 114 subframe may be coupled to the central chassis member 110 through a sliding mechanical coupling that is manually adjustable or driven by an actuator in response to a drive signal, to adjust the wheelbase 160 by adjusting the position of the front 162 and or the rear 164 axle relative to the central chassis member 110.

The wheelbase 160 may be adjusted, for example, via wired or wireless electronic communication from external control device such as a handheld portable electronic device (smartphone, tablet, wearable computing device, etc.). The handheld portable electronic device may, for example, wirelessly communicate with the chassis control circuitry 140 to provide a wheelbase adjustment signal. In response to the wheelbase adjustment signal, the chassis control circuitry 140 may provide a drive signal to an actuator, e.g., a linear actuator, coupled to the chassis. In response to the drive signal, the actuator may drive the front 112 and/or rear 114 subframe to cause relative movement of the front 112/114 subframe relative to the central chassis member 110 until a desired wheelbase 160 is achieved, e.g., as indicated by one or more position sensors coupled to the central chassis member 110 and/or the front 112 and/or rear 114 subframes. In other instances, the wheelbase 160 may be autonomously adjusted by the chassis control circuitry 140 based, at least in part on the wheelbase of a vehicle body to be mounted to the electric vehicle chassis 100. The use of an adjustable wheelbase electric vehicle chassis 100 beneficially permits the use of the electric vehicle chassis 100 for a wide variety of vehicle body styles.

The central frame member 110, the front subframe 112, and the rear subframe 114 may be fabricated using one or more materials that include but are not limited to: aluminum and/or aluminum alloys; stainless steel; titanium and/or titanium alloys; carbon steel and/or carbon steel alloys; carbon fiber; or combinations thereof. Although not depicted in FIG. 1, in embodiments, one or more mechanical connections may operatively couple the vehicle body to the electric vehicle chassis 100. For example, a mechanical steering and/or brake/emergency brake linkage may operatively couple the vehicle body to the electric vehicle chassis 100.

One or more communication interfaces 130A-130n and the chassis control circuitry 140 may be disposed within the central chassis member 110, the adjustable front subframe 112 and/or the adjustable rear subframe 114. One or more electric motors 120A receives an electrical input from at least one energy storage device 122 and provide drive power to the front axle 162, e.g., through associated gear trains. In embodiments where the front axle 162 is provided as separate left and right axles, multiple electric motors 120A may be used to provide power independently to the left and right axles. Similarly, in some embodiments, one or more electric motors 120B receives an electrical input from at least one energy storage device 122 and provides drive power to the rear axle 164. In embodiments where the rear axle 164 is provided as separate left and right axles, multiple electric motors 120B may be used to provide power independently to the left and right axles. The electric motors 120A and 120B may have the same or different power outputs. In embodiments, the electric motors 120A and 120B may include one or more single-phase or three-phase alternating current (AC) motors. In embodiments, the electric motors 120A and 120B may include one or more direct current (DC) motors. The electric motors 120A and 120B may have an individual power output of about: 25 horsepower (HP) or more; 50 HP or more; 100 HP or more; 150 HP or more; 200 HP or more; 250 HP or more; 300 HP or more; 400 HP or more; 500 HP or more; or 750 HP or more. In embodiments, the electric motors 120A and 120B may receive an electrical input from separate energy storage devices 122. In embodiments, the electric motors 120A and 120B may be used to generate energy, when not being driven, that will charge at least one energy storage device 122. In embodiments, the electric motors 120A and 120B may receive an electrical input from the electrical charging motor directly.

In embodiments, the central chassis member 110, the front subframe 112 and/or the rear subframe 114 may include one or more thermal energy transfer devices, such as one or more air/air heat exchangers, one or more air/liquid heat exchangers, one or more Peltier effect thermal electric coolers, one or more air conditioning evaporator/condenser systems, or combinations thereof. The chassis control circuitry 140 may cause the one or more thermal energy transfer devices to control, alter, or adjust the temperature of the energy storage device 122 at one or more points during the charge cycle and/or discharge cycle of the energy storage device 122. Alternatively or additionally, the chassis control circuitry 140 may cause the one or more thermal energy transfer devices to control, alter, or adjust the temperature within the vehicle body (e.g., function as an HVAC system) by supplying heated, cooled, or otherwise conditioned air to a ventilation system disposed in a vehicle body physically and operably coupled to the electric vehicle chassis 100.

Figure 2:
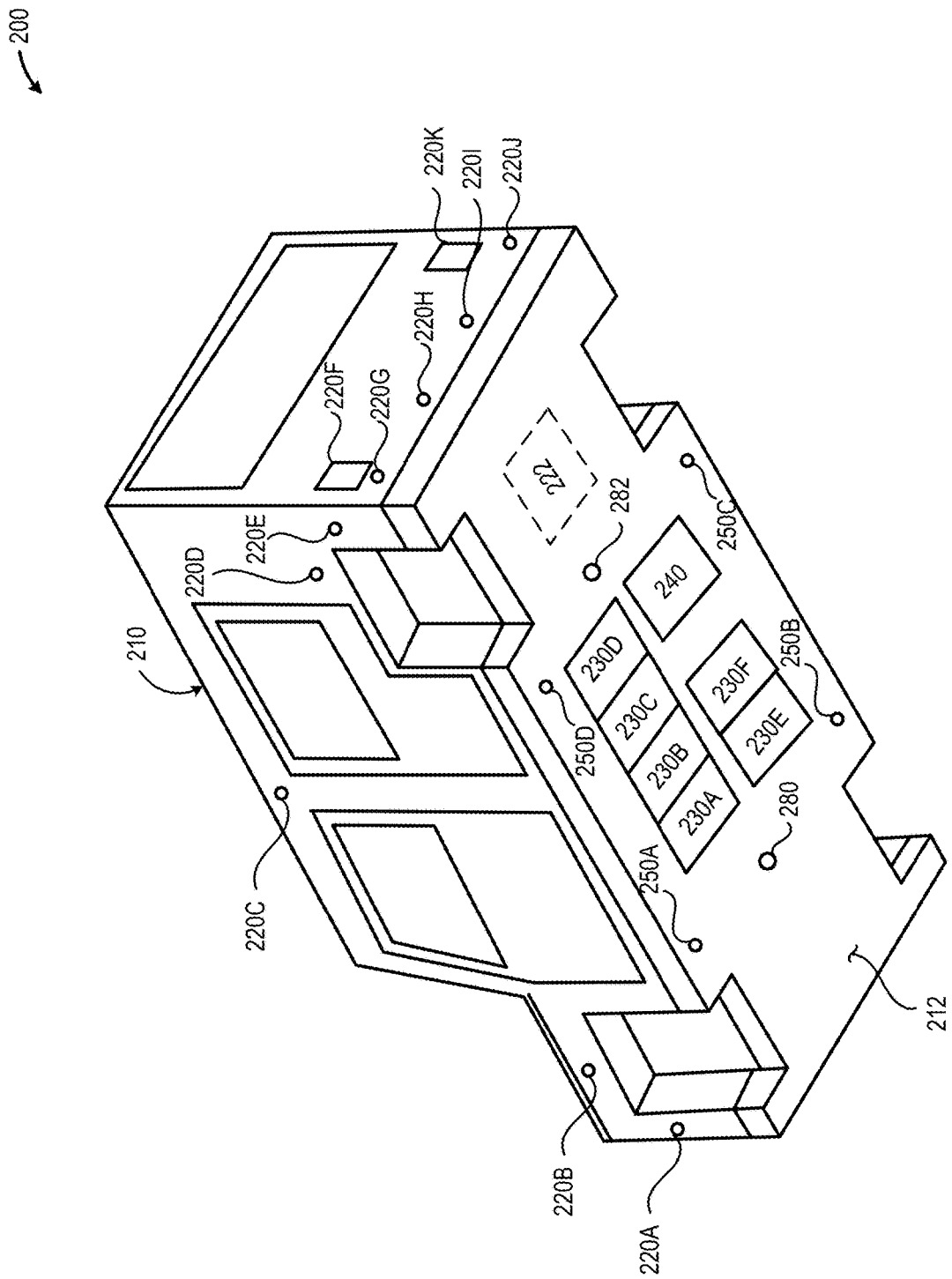
FIG. 2 is a lower perspective view depicting an example vehicle body that includes a body having a lower surface that may be disposed proximate an electric vehicle chassis as described in detail in FIG. 1, in accordance with at least one embodiment described herein.

One or more energy storage devices 122 may be disposed in, on, about, or around all or a portion of the central chassis member 110, the adjustable front subframe 112, and/or the adjustable rear subframe 114. In embodiments, the one or more energy storage devices 122 may include any number and/or combination of rechargeable batteries. In embodiments, the one or more energy storage devices 122 may include any number and/or combination of capacitive energy storage devices, such as one or more ultracapacitors or one or more super capacitors. The one or more energy storage devices 122 may include one or more charging systems to replenish the charge in the energy storage device 122 using an external power supply such as an external power grid, solar cells, or similar. Such charging systems may include any number and/or combination of AC/DC converters, DC/AC inverters, power filters, power monitors, and/or thermal control (i.e., cooling and/or heating) systems used to safely and efficiently replenish the charge in the one or more energy storage devices 122. In embodiments, the one or more energy storage devices 122 may have any storage capacity. In embodiments, the one or more energy storage devices 122 may have a capacity of about: 75 kilowatt hours (kWh) or less; 100 kWh or less; 150 kWh or less; 200 kWh or less; 250 kWh or less; or 400 kWh or less. In at least some embodiments, the one or more energy storage devices 122 may be disposed, in whole or in part, within one or more void spaces formed in at least one of: the central chassis member 110, the front subframe member 112, and/or the rear subframe member 114. The energy storage devices 122 provide electrical energy for energizing the electric motors 120A and 120B for driving the axles 162 and 164 to rotate for moving the vehicle along a surface. The energy storage devices may also provide electrical energy for operating one or more components of the chassis 100, e.g., the control circuitry 140, communication interfaces 130, etc., and/or one or more components of the vehicle body 200 (FIG. 2).

One or more communication interfaces 130A-130F (collectively, "communication interfaces 130") may be disposed in, on, or about at least a portion of the central chassis member 110, the front subframe 112, and/or the rear subframe 114. The communication interfaces 130A-130F provide unidirectional and/or bidirectional communication between the electric vehicle chassis 100 and a vehicle body physically coupled to the electric vehicle chassis 100. The communication interfaces 130A-130F may include one or more wired communication interfaces, one or more wireless communication interfaces, or any combination thereof.

In embodiments, the communication interfaces permit the communication of signals between the electric vehicle chassis 100 and the vehicle body such that the instruments, interfaces, and other user informational devices such as an automotive head unit disposed in the vehicle body provide information and/or data associated with operation, performance, and/or status of the electric vehicle chassis 100. For example, in at least some embodiments, the communication interfaces 130A-130F may communicate signals that activate steering, suspension, and braking functions initiated by a vehicle operator in the vehicle body. In embodiments, the one or more communication interfaces may include one or more quick connect/disconnect interfaces that engage upon placement of the vehicle body on the electric vehicle chassis 100 and disengage upon separation of the vehicle body from the electric vehicle chassis 100. In embodiments, the communication interfaces 130A-130F and/or other systems such as HVAC connections 180, and/or electrical power connections 182 may be disposed at one or more defined locations in, on, or about the central chassis member 110, the front subframe 112, and/or the rear subframe 114. Communication interfaces and/or other systems such as HVAC connections, and/or electrical power connections on the vehicle body may be disposed at one or more corresponding defined locations, thereby beneficially permitting the accommodation of any number of interchangeable vehicle bodies/body styles on a common electric vehicle chassis 100. Although the one or more communication interfaces 130 are depicted in FIG. 1 as including a total of six (6) separate communication interfaces 130A-130F, one of ordinary skill in the relevant arts will readily appreciate that a greater or lesser number of communication interfaces 130 may be used instead of the six depicted in FIG. 1.

The chassis control circuitry 140 may include any number and/or combination of processor-based devices capable of monitoring, controlling, communicating, and/or adjusting one or more electric vehicle chassis 100 and/or vehicle body operating parameters. In embodiments, the chassis control circuitry 140 may include, in whole or in part, one or more network or cloud-based processor-based devices. In embodiments, the chassis control circuitry 140 may include one or more non-transitory storage devices to store or otherwise retain one or more instructions, programs, and/or applications capable of operating one or more devices, components, or systems included in the electric vehicle chassis 100. In some embodiments, the chassis control circuitry 140 may receive information and/or data associated with the vehicle body attached to the electric vehicle chassis 100 and may alter, adjust, or control one or more operational parameters of the electric vehicle chassis 100 based, at least in part, on the received vehicle body data. For example, the chassis control circuitry 140 may adjust the suspension coupled to the electric vehicle chassis 100 to a relatively stiff setting if a hi-cube transport van type vehicle body is coupled to the electric vehicle chassis 100 and to a relatively softer setting if a sports car type vehicle body is coupled to the electric vehicle chassis 100. In embodiments, the chassis control circuitry 140 may adjust the wheelbase 160 of the electric vehicle chassis 100 to match the wheelbase of the vehicle body to be attached to the electric vehicle chassis 100. In embodiments, the chassis control circuitry 140 may adjust the track width 170 (the width of the front 162 and rear 164 axles, as shown in FIG. 1) of the electric vehicle chassis 100 to match the width of the vehicle body to be attached to the electric vehicle chassis 100. In embodiments, the chassis control circuitry 140 may include one or more charging circuits to charge the one or more energy storage devices 122 using an external power supply, such as an industrial, commercial, or residential power grid. The chassis control circuitry 140 communicatively couples to the one or more communication interfaces 130A-130n via one or more wired or wireless connections.

The chassis control circuitry 140 may include one or more data stores, data tables, and/or databases that include information associated with each respective one of a plurality vehicle bodies. Such information may include but is not limited to one or more electric vehicle chassis 100 parameters, parameters associated with the vehicle body (e.g., type and range of instrumentation carried by the vehicle body, center of gravity of the vehicle body, wheelbase and track width associated with the vehicle body, steering/acceleration/braking parameters associated with the vehicle body, vehicle head unit capabilities, vehicle HVAC capabilities, vehicle occupant comfort capabilities, and similar). Thus, when a vehicle body is disposed proximate the electric vehicle chassis 100, the chassis control circuitry 140 may autonomously adjust one or more electric vehicle chassis 100 parameters based on information associated with the vehicle body and retrieved or otherwise accessed by the chassis control circuitry 140 using one or more data stores, data tables, or databases.

The electric vehicle chassis 100 includes a plurality of physical connectors 150A-150D (collectively, "physical connectors 150"). The physical connectors 150 may physically and/or operably couple the electric vehicle chassis 100 to a vehicle body. The physical connectors 150 may include one or more connectors, latches, locks, or similar fittings capable of detachably or non-detachably attaching the vehicle body to the electric vehicle chassis 100. In embodiments, the physical connectors 150 may include one or more apertures disposed in, on, about, or across at least a portion of the upper surface 112 of the electric vehicle chassis 100. In at least some embodiments, the physical connectors 150 may include one or more threaded apertures disposed in, on, about, or across at least a portion of the upper surface 112 of the electric vehicle chassis 100. In embodiments, the physical connectors 150 may include one or more types of physical connectors suitable for physical coupling to corresponding attachment features disposed in, on, or about the vehicle body, such as attachment features installed or otherwise provided by a manufacturer or supplier of the vehicle body.

In yet other embodiments, the physical connectors 150 may include an adapter plate or similar assembly that is disposed between the electric vehicle chassis 100 and the vehicle body. In such embodiments, the upper surface of the physical connector/adapter plate 150 may have one or more types of connectors disposed in locations to accommodate attachment features installed or otherwise provided by a manufacturer or supplier of the vehicle body while the lower surface of the physical connector/adapter plate 150 may have connectors disposed in locations to accommodate corresponding connectors disposed on the electric vehicle chassis 100. Such a physical connector/adapter plate 150 may beneficially enable the accommodation of many different vehicle body types on a standardized electric vehicle chassis 100 simply by reconfiguring the attachment points on the upper and lower surfaces of the physical connector/adapter plate 150.

In embodiments, the physical connectors 150 may be electrically actuated such that the chassis control circuitry 140 causes the physical connectors 150 to autonomously engage upon detecting the placement of a vehicle body proximate the electric vehicle chassis 100 and to autonomously disengage upon receipt of a request to release the vehicle body from the electric vehicle chassis 100. In embodiments, the physical connectors 150 may include a multi-part assembly in which each of the physical connectors 150 include one or more fasteners, one or more retained pins, or similar devices to provide a "fail-safe" attachment between the vehicle body and the electric vehicle chassis 100. In some embodiments, some or all of the communication interfaces 130 may be physically incorporated into some or all of the physical connectors 150. In some embodiments, the communication interfaces 130 and/or physical connectors may incorporate known wireless transmitters and/or receivers.

FIG. 2 is a lower perspective view depicting an example vehicle body 200 that includes a body 210 having a lower surface 212 that may be disposed proximate an upper surface of an electric vehicle chassis 100 as described in detail in FIG. 1, in accordance with at least one embodiment described herein. As depicted in FIG. 2, one or more communication interfaces 230A-230F (collectively, "communication interfaces 230") may be disposed on the lower surface 212 of the vehicle body 210. In embodiments, the location of the communication interfaces 230A-F on the lower surface 212 of the vehicle correspond to the location of the communication interfaces 130A-F, respectively, on the upper surface of the electric vehicle chassis 100, thereby permitting coupling of the communication interfaces 230A-F with the communication interfaces 130A-F and bidirectional exchange of information between the vehicle body 210 and the electric vehicle chassis 100 through the communication interfaces 230A-F and 130A-F. Beneficially, the vehicle body 210 can have any type of body style, since the standardized placement of the communication interfaces 230 on the vehicle body and the corresponding communication interfaces 130 on the electric vehicle chassis 100 provide a functional, operating, vehicle.

The vehicle body 210 may also include one or more processor-based devices 240. In at least some embodiments, the one or more processor-based devices 240 may include one or more non-transitory storage devices, such as read only memory (ROM), electrically erasable programmable read only memory (EEPROM), flash memory circuitry, optical memory circuitry, or electromagnetic rotating storage devices. The one or more non-transitory storage devices may store information and/or data associated with the vehicle body 210. For example, information or data representative of the wheelbase 160 of the vehicle body 210, the allowable track width 170 of the vehicle body 210, the weight of the vehicle body 210, the location of the center of gravity of the vehicle body 210, and/or the overall width, length, and height of the vehicle body 210. In other embodiments, the non-transitory storage device may also include information such as: the vehicle body manufacturer, the available instrumentation in the vehicle body 210, the capabilities of the head unit in the vehicle body 210, the status of safety systems (seat belts, airbags, etc.) in the vehicle body 210, safety accessories disposed in the vehicle body 210, occupant convenience accessories install in the vehicle body 210, a preferred ride height for the vehicle body 210, and/or preferred suspension settings for the vehicle body 210.

In addition, one or more HVAC connections 280 and one or more power connections 282 may be disposed on the lower surface 212 of the vehicle body 210. In embodiments, the one or more HVAC connections 280 may accept a flow of heated, cooled, or air-conditioned air generated and supplied, at least in part, by the electric vehicle chassis 100. In other embodiments, the HVAC equipment to supply heated, cooled, or air-conditioned air to the vehicle body 210 may include electrically powered HVAC equipment operably coupled to the vehicle body 210 rather than the electric vehicle chassis 100. The one or more power connections 282 supply electrical power from the one or more energy storage devices 122 to the vehicle body 210. In embodiments, the power supplied by the electric vehicle chassis 100 to the vehicle body 210 may include conditioned and/or filtered alternating current and/or direct current power.

In such a manner, the chassis control circuitry 140 and the one or more processor-based devices 240 are able to communicate and repurpose (where necessary) the instrumentation and systems carried by the vehicle body 210. For example, the fuel gauge in the vehicle body 210 may be repurposed as a charge meter that displays the remaining charge in the one or more energy storage devices 122 in the electric vehicle chassis 100. In another example, the climate control devices in the vehicle body 210 may control the flow of heated, cooled, or air-conditioned air from the electric vehicle chassis 100 into the vehicle body via the one or more HVAC connections 280. In yet another example, an automotive head unit installed in the vehicle body 210 may be repurposed to display electric vehicle chassis 100 information and to provide the occupant of the vehicle an input device to alter, adjust, control, or change one or more vehicle performance parameters autonomously set by the chassis control circuitry 140.

One or more attachment features 250A-250D (collectively, "attachment features 250") may be disposed in, on, about, or across at least a portion of the lower surface 112 of the vehicle body 210. In embodiments, the attachment features 250 may include attachment features complimentary to the physical connectors 150 disposed in, on, about, or across the electric vehicle chassis 100. For example, in some embodiments, the physical connectors 150 included in the electric vehicle chassis 100 may include a plurality of male connectors and the attachment features 250 included in the vehicle body 210 may include a plurality of corresponding female connectors into which the male connectors 150 may be inserted. In another embodiment, the physical connectors 150 included in the electric vehicle chassis 100 may include one or more bars or cylindrical members and the attachment features 250 included in the vehicle body 210 may include a plurality of latch members that engage or otherwise capture the one or more bars or cylindrical members.

In at least some embodiments, the vehicle body 210 may include one or more energy storage devices 222 for providing electrical energy to electric motors, e.g., motors 120A, 120B, for providing drive power to the front 162 and or rear 164 axle 162, e.g., through associated gear trains. When combined with the storage capacity of the one or more energy storage devices 122 carried by the electric vehicle chassis 100, the range of the vehicle is effectively increased. In embodiments, the one or more energy storage devices 222 may include any number and/or combination of rechargeable batteries. In embodiments, the one or more energy storage devices 222 may include any number and/or combination of capacitive energy storage devices, such as one or more ultracapacitors or one or more super capacitors. The one or more energy storage devices 222 may be charged using charging equipment carried by the electric vehicle chassis 100 or the vehicle body 210 may include dedicated charging equipment. In embodiments, the one or more energy storage devices 222 may have any storage capacity. In embodiments, the one or more energy storage devices 222 may have a capacity of about: 75 kilowatt hours (kWh) or less; 100 kWh or less; 150 kWh or less; 200 kWh or less; 250 kWh or less; or 400 kWh or less.

In at least some embodiments, the vehicle body 210 may include a plurality of sensors 220A-220K (collectively, "sensors") to collect information and/or data associated with the vehicle body 210 and/or the ambient environment about the vehicle body 210. In some instances, at least a portion of the information and/or data collected by the sensors 220 may be communicated to the chassis control circuitry 140. In some instances, at least a portion of the information and/or data collected by the sensors 220 may be communicated to the one or more processor-based devices 240 carried by the vehicle body 210. In embodiments, the sensors 220 may include but are not limited to: one or more image acquisition devices, one or more video image acquisition devices, one or more infrared sensors, one or more ultrasonic sensors, one or more lidar sensors, one or more radar sensors, or one or more proximity sensors.

In embodiments, the plurality of sensors included in the sensor suite of sensors 220A-220K provided by a vehicle manufacturer or vehicle supplier may remain intact on the vehicle body 210, thereby facilitating the native Level 2 through Level 6 autonomous vehicle capability provided and/or supported by the vehicle manufacturer or vehicle supplier, or a custom solution. For example, the vehicle manufacturer or vehicle supplier may incorporate any number of sensors 220A-220K of various types (video, still, visible, infrared, ultrasonic, lidar, radar, etc.) disposed in locations such as: the lower front facia, the rear facia, in side badges or decorative trim, in the vehicle grill, in or behind the vehicle emblem. In addition, other sensors 220A-220K may be positioned or otherwise disposed in, on, or about the vehicle windshield, side glass, rear glass, rear view mirrors, side view mirrors, and similar.

Figure 3:
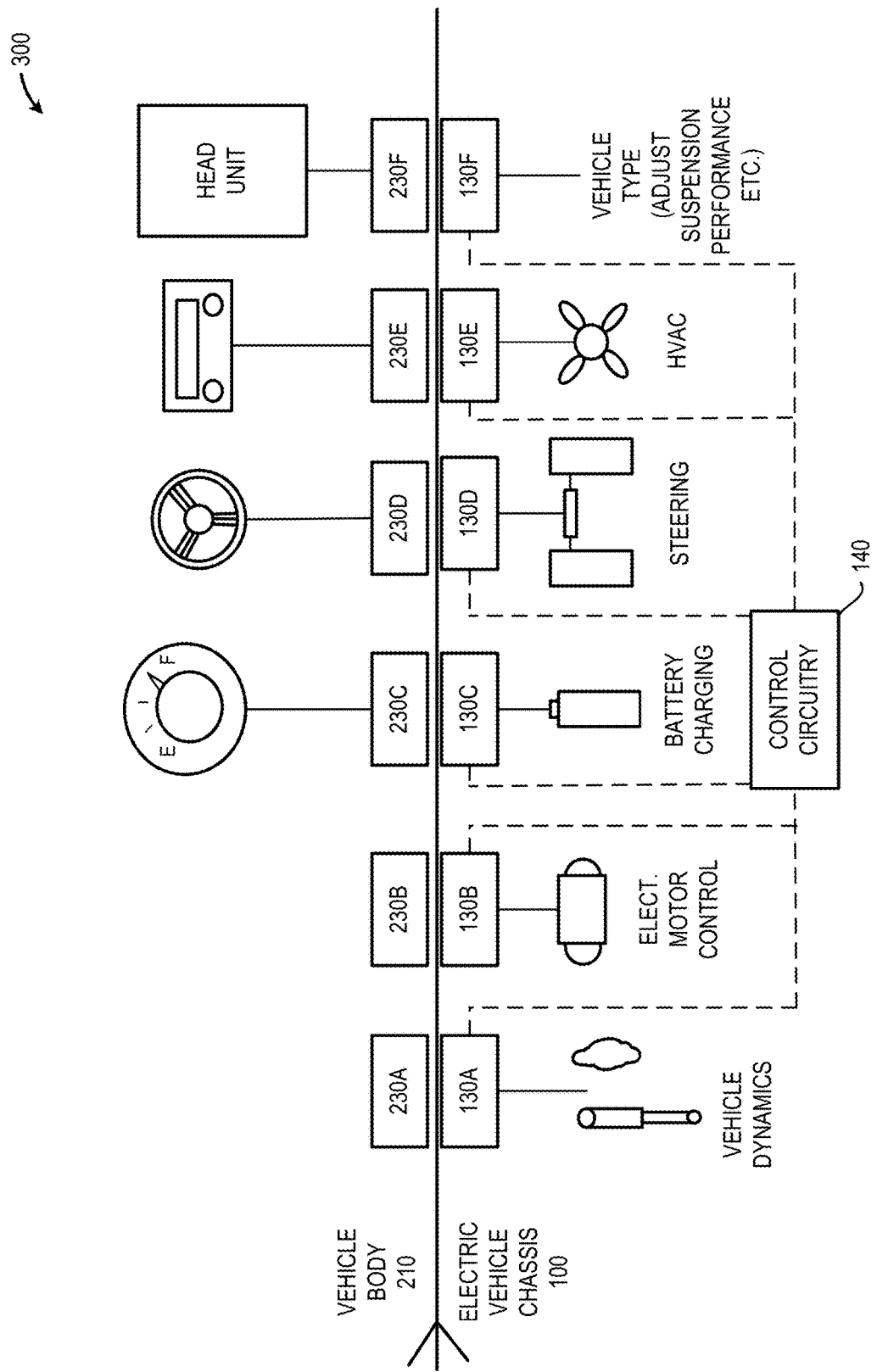
FIG. 3 is a schematic diagram depicting an example of an operable coupling between an electric vehicle chassis and a vehicle body, in accordance with at least one embodiment described herein.

FIG. 3 is a schematic diagram depicting an example of an operable coupling between an electric vehicle chassis 100 and a vehicle body 210, in accordance with at least one embodiment described herein. As depicted in FIG. 3, a first communication interface connection 130A/230A communicatively couples the vehicle dynamics (shock rebound, springs, air suspension, braking, etc.) associated with the electric vehicle chassis 100 to the vehicle body 210. Such a connection may provide the vehicle occupant with the ability to alter, adjust, or control vehicle dynamic settings that have been autonomously set by the chassis control circuitry 140.

A second communication interface connection 130B/230B communicatively couples the electric motors 120A and 102B to the throttle included in the vehicle body 210. Thus, when the vehicle occupant adjusts the throttle in the vehicle body, the speed of the electric motors 120A and/or 120B (which are energized by the energy storage devices 122 and/or 222) is adjusted a corresponding amount.

A third communication interface connection 130C/230C communicatively couples the fuel gauge in the vehicle body 210 to the one or more energy storage devices 122 disposed in, on, or about the electric vehicle chassis 100 such that the fuel gauge provides the vehicle occupant with an indication of the amount residual charge remaining in the one or more energy storage devices 122.

A fourth communication interface connection 130D/230D communicatively couples the steering wheel in the vehicle body 210 to the steering rack disposed in, on, or about the electric vehicle chassis 100 such that an input to the steering wheel alters the angle of at least two of the wheels attached to the front 162 and/or rear 164 axles electric vehicle chassis 100.

A fifth communication interface connection 130E/230E communicatively couples the HVAC controls disposed in the vehicle body 210 to one or more cooling, heating, or air conditioning devices disposed in, on, or about the electric vehicle chassis 100 such that when a vehicle occupant adjusts the HVAC system in the vehicle body 210, the electric vehicle chassis 100 provides the appropriate airflow via the one or more HVAC connections 180/280.

A sixth communication interface connection 130F/230F communicatively couples the head unit in the vehicle body 210 to the chassis control circuitry 140 disposed in the electric vehicle chassis 100. Communicatively coupling the head unit to the chassis control circuitry 140 permits the chassis control circuitry 140 to provide/display information and/or data to the occupants of the vehicle body.

Figure 4:
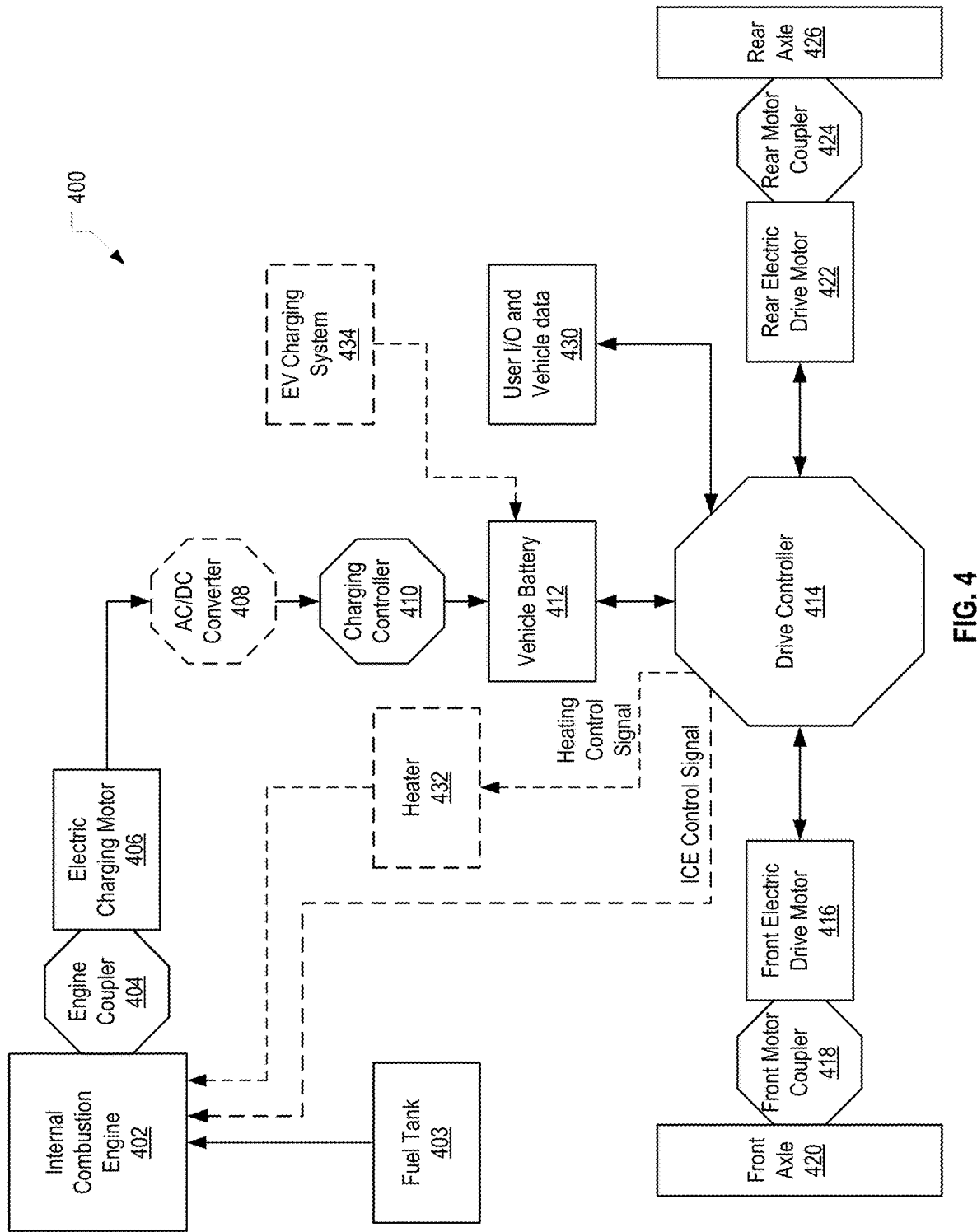
FIG. 4 is a block diagram of an electric vehicle consistent with the present disclosure.

Another challenge related to known electric vehicles is their limited range resulting from the storage capacity of the energy storage device used to drive the vehicle. FIG. 4 illustrates an example electric vehicle configuration 400 wherein an internal combustion engine (ICE) drives an electric motor for charging the energy storage device, or for driving the electric motor(s) at the axle(s). The illustrated example embodiment includes an internal combustion engine 402, a fuel tank 403, an engine coupler 404, an electric charging motor 406, an optional AC/DC converter 408, a charging controller 410, a vehicle battery 412, a drive controller 414, a front electric drive motor 416, a front motor coupler 418 coupling the front electric drive motor 416 to the front axle 420 of the vehicle 400, a rear electric drive motor 422 and a rear motor coupler 424 coupling the rear electric drive motor 422 to the rear axle 426 of the vehicle 400.

In the illustrated example embodiment, the vehicle battery 412 forms the energy storage device and is illustrated as a single battery. It is to be understood, however, the battery 412 may include multiple batteries and/or capacitors for storing electrical energy for driving the vehicle 400. Also, the illustrated example embodiment includes a front electric drive motor 416 and a rear electric drive motor 422. It is to be understood that in embodiments consistent with the present disclosure only one of the front 416 or rear 422 electric drive motors may be provided and/or one or both of the front 416 or rear 422 electric drive motors may be configured as multiple electric motors. In addition, the features illustrated and described in connection with FIG. 4 may be combined in a modular electric vehicle as described herein or may be implemented in a non-modular vehicle configuration. For example, the configuration described in connection with FIG. 4 may be implemented by modification of a vehicle commercially available from an original equipment manufacturer (OEM).

In the illustrated example embodiment, the ICE 402 is coupled for driving an electric charging motor 406 through the engine coupler 404. The ICE 402 may be any commercially available OEM ICE provided for providing vehicle drive power in a commercially available vehicle. For example, the ICE 402 may be a TOYOTA LAND CRUISER® (TLC) 70 series engine, commercially available as OEM equipment in vehicles provided by Toyota Motor Corporation of Aichi 471-8572, Japan. Fuel, e.g., diesel fuel or gasoline, from the fuel tank 403 mounted to the vehicle 400 is provided to the ICE 402 for the combustion process of the ICE 402.

The electric charging motor 406 may be an alternating current (AC) or direct current (DC) motor configured as a generator. The output shaft of the ICE 402 is coupled to a drive shaft of the electric charging motor 406 through the engine coupler 404. Rotation of the drive shaft of the electric charging motor 406 by the ICE 402 causes the electric charging motor 406 to produce an output charging current for charging the vehicle battery 412 or to directly power the front electric drive motor 416 and/or rear electric drive motor 422.

The engine coupler 404 may include gearing for converting the rotational output of the ICE 402 output shaft to an appropriate rotational input drive for the electric charging motor.

Figure 5:
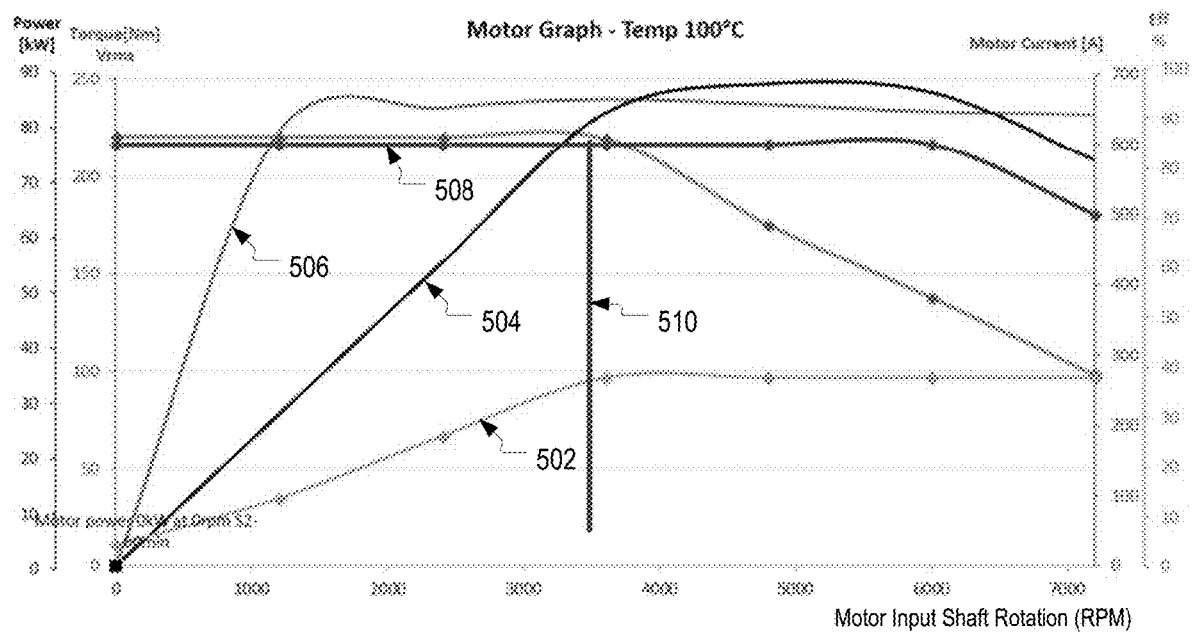
FIG. 5 includes plots illustrating motor characteristics of one example of an electric charging motor useful in an electric vehicle consistent with the present disclosure.

The exact gearing of the engine coupler may depend on the configuration of the ICE 402 and the electric charging motor 406. In one example embodiment, the electric charging motor 406 may be configured as a NetGain HyPer9 HV AC Motor X144, which is commercially available from EV West of San Marcos, CA, and may have the characteristics illustrated by plots 502, 504, 506, and 508 in FIG. 5 at a temperature of 100 degrees Celsius. In FIG. 5, plot 502 illustrates the motor RMS voltage vs. input shaft rotation, plot 504 illustrates the motor output power vs. input shaft rotation, plot 506 illustrates the motor current vs. input shaft rotation, and plot 508 illustrates the motor efficiency. As indicated by line 510 an electric charging motor 406 having the characteristics illustrated in FIG. 5 may require a minimum rotational drive to its input shaft of 3600 revolutions per minute (RPM) to achieve high efficiency and output power and it may require 163 foot-pounds (ft-lbs.), i.e., about 220 newton-meters (NM), of torque to drive the AC motor at 3600 RPM.

Figure 6:
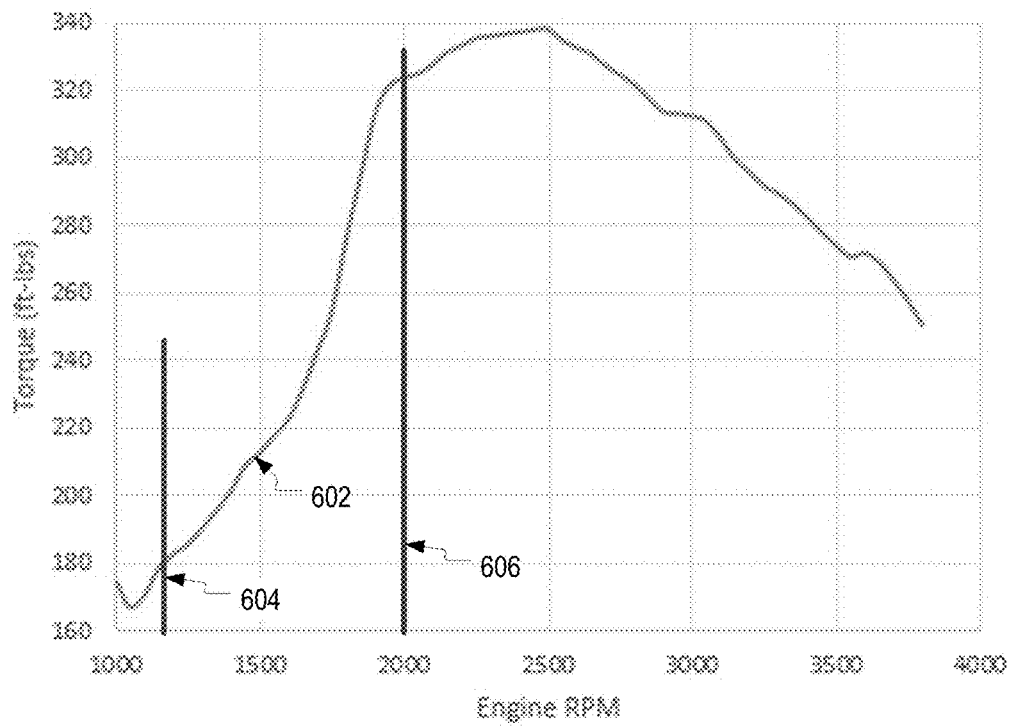
FIG. 6 includes a plot of torque vs. engine RPM illustrating characteristics of one example of an internal combustion engine useful in an electric vehicle consistent with the present disclosure.

An ICE 402 in this example may be configured as a TLC 70 series engine having the motor torque characteristic illustrated in FIG. 6. In FIG. 6, plot 602 of the motor output torque vs. engine RPM. As illustrated by line 604, in the illustrated example the ICE 402 produces the 163 ft-lbs. of torque to drive the electric charging motor 406 by an engine RPM of about 1200 RPM.

An engine coupler in this example may use a 1.8:1 gearing, so that the ICE 402 would need to spin at 2000 RPM (producing 320+ ft-lbs. of torque, as illustrated by line 606 in FIG. 6). The electric charging motor 406 would require 293 ft-lbs. of torque to spin at 3600 RPM. At 3600 RPM in this example, the electric charging motor 406 would supply about 82.7 kilowatts (kW) of charge to the vehicle battery 412 per hour. For a vehicle using about 900 watt-hours (Wh) per mile (Wh/mi), an hourly discharge rate for the vehicle battery may be about 54 kW, which would leave about 28.7 kW of headroom from the hourly charge of 82.7 kW to operate ancillary electric devices in the vehicle before the vehicle battery 412 discharges at a rate faster than it can be charged by the electric charging motor 406. This is beneficial in both hybrid and full-electric vehicle configurations but can be especially valuable in a full-electric configuration where the vehicle battery 412 provides all the drive power for the vehicle and the ICE 402 does not provide any drive power for the vehicle at any time. In such a full-electric configuration, the range of the vehicle 400 may be limited only by the amount of fuel in the fuel tank 403 since the vehicle battery 412 is always sufficiently charged by the electric charging motor 406.

Although the system is described herein as providing 82.7 kW to the vehicle battery 412 per hour in the example described above, those of ordinary skill in the art will recognize that the charge supplied to the vehicle battery 412 will depend on the construction of the vehicle battery. The ICE 402, engine coupler 404, and electric charging motor 406 may be selected and configured to provide any desired charge to the vehicle battery 412. In some embodiments, the output of the electric charging motor 406 may be configured to provide a charge of at least 75 kW per hour to the vehicle battery.

With reference again to FIG. 4, in embodiments where the electric charging motor 406 is an AC motor, the electrical output of the electric charging motor 406 may be coupled to an optional AC/DC converter 408 to convert the output of the motor to a DC output. The AC/DC converter 408 may be any known AC/DC converter configuration configured to operate the output power of the electric charging motor 406.

The output of the electric charging motor 406, or the optional AC/DC converter 408, is coupled to the charging controller 410. The charging controller 410 may be a processor-based device configured to receive the output of the electric charging motor 406, or the optional AC/DC converter 408 and provided a regulated output configured to charge the vehicle battery 412 in accordance with the charging characteristics of the vehicle battery.

The output of the vehicle battery 412 is coupled to the drive controller 414. The drive controller 414 may be a processor-based device configured to couple an output of the vehicle battery 412 to the front 416 and/or rear 422 electric drive motors to energize the front 416 and/or rear 422 electric drive motors, e.g., in response to user inputs such as a throttle control input, a gear selection input, etc. In some embodiments, the drive controller 414 may be configured to send and receive user input/output (e.g., throttle control, gear selection, etc.) and vehicle data (e.g., speed, RPM, etc) 430 to/from OEM user input components and gauge components/clusters and to control electric drive of the vehicle 400 and report operation of the vehicle 400 using the OEM user input and gauge components. For example, the drive controller 414 may be configured to energize the front 416 and/or rear 422 electric drive motors in response to the OEM vehicle throttle, may be coupled to the OEM fuel gauge to display the charge of the vehicle battery 412 on the OEM fuel gauge, etc.

The front and rear electric drive motors may be any known AC or DC electric drive motor useful for driving an axle of a vehicle. The front electric drive motor 416 is coupled to the front axle 420 through the front motor coupler 418. The front motor coupler 418 includes gearing for transferring the rotational output of the front electric drive motor 416 to the front axle 420 for causing rotation of the front axle 420. In some embodiments, the front motor coupler 418 may be coupled directly to the front differential of an OEM vehicle so that the front electric drive motor 416 drives the front axle 420 through the front motor coupler 418 and the OEM differential.

The rear electric drive motor 422 is coupled to the rear axle 426 through the rear motor coupler 424. The rear motor coupler 424 includes gearing for transferring the rotational output of the rear electric drive motor 422 to the rear axle 426 for causing rotation of the rear axle 426. In some embodiments, the rear motor coupler 424 may be coupled directly to the rear differential of an OEM vehicle so that the rear electric drive motor 422 drives the rear axle 426 through the rear motor coupler 424 and the OEM differential.

In some embodiments, the front 416 and rear 422 electric drive motors may be coupled to the front 420 and rear 426 axles through front 418 and rear 424 motor couplers, respectively in a manner to provide known regenerative braking functionality. In this configuration, braking of the vehicle causes the front 416 and rear 422 electric drive motors to rotate in reverse and act generators for providing charging outputs to the drive controller 414. The drive controller 414 may be configured to transfer the charging outputs of the front 416 and rear 422 electric drive motors in regenerative braking configuration to the vehicle battery 412 for charging the vehicle battery 412, e.g., under the control of the charging controller 410.

The drive controller 414 may be configured, e.g., using a set of programmed instructions, to provide one or more of a variety of beneficial functionalities. For example, the drive controller 414 may be configured to provide an ICE control signal to disable the ICE 402, e.g., in response to a user input, to provide a silent operating mode. Also, although the vehicle 400 may be solely an electric-drive vehicle, i.e., the ICE 402 does not provide drive power for the vehicle 400 at any time, the drive controller 414 may be configured to modify the RPM of the ICE 402 with the vehicle throttle, e.g., while placing a variable load on the ICE 402 using the electric charging motor 406. For example, as the vehicle user depresses the throttle the drive controller 414 may provide an ICE control signal to the ICE 402 to increase the RPM of ICE 402 and as the vehicle user releases the throttle the drive controller 414 may provide an ICE control signal to the ICE 402 to decrease the RPM of the ICE 402. With this configuration, the vehicle 400 simulates the sound of operation of a vehicle with ICE drive power, even though the vehicle 400 is solely an electric-drive vehicle and the ICE 402 does not provide any drive power for the vehicle. In some embodiments, the drive controller 414 may use other user I/O and or vehicle data 430, e.g., vehicle accelerometer data, gyro data, the load on the front 416 and rear 422 electric drive motors, to simulate the sound made by operation of a vehicle with ICE drive power when driving on varied terrain such as flat ground, over rocks, up/down hills, etc.

In some embodiments, the drive controller 414 may be configured to provide an ICE control signal to regulate the ICE 402 RPM dependent on the charge of the vehicle battery 412 and/or the dynamic load on the front 416 and rear 422 electric drive motors. This can provide beneficial charging efficiency to ensure the vehicle battery 412 is properly charged in a variety of operating conditions. In some embodiments, the drive controller 414 may be configured to enable 4-wheel drive (4WD) or 2-wheel drive (2WD), in a rear-wheel drive (RWD) or front-wheel drive (FWD) mode, in a response to a user input, or automatically, depending on a driving scenario, terrain profile, battery charge, etc. This feature may allow the vehicle 400 to minimize or reduce consumption of the vehicle battery 412 charge.

In some embodiments, a heater 432 may be coupled to the ICE 402 to keep the ICE 402 warm in cold temperatures to allow quick starting and/or avoid the need to use external glow plugs to warm a diesel ICE 402. The drive controller 414 may be configured to couple an output of the vehicle battery 412 to the heater 432 using a heating control signal and, in response to the heating control signal, the heater 432 may warm the ICE 402. The heating control signal may be provided by the drive controller 414 automatically, e.g., when a temperature sensor on the vehicle 400 senses that the ambient temperature has dropped below a target temperature, or in response to a user input.

These and other features, alone and in any combination, may be provided in a drive controller 414 consistent with the present disclosure. Also, the charging controller 410 and the drive controller 414 are illustrated in FIG. 4 as separate components for simplicity and ease of explanation only. It is to be understood, that any of the features or functionalities of the charging controller 410 and/or the drive controller 414 may be combined into a single controller or in separate controllers.

In some embodiments, a vehicle consistent with the present disclosure may be constructed by retrofitting an existing OEM vehicle. Such a retrofit may proceed, for example, by removing the OEM transmission, drive shaft, differential gears, fuel tank and lead acid batteries. The electric charging motor 406 may then be coupled to the ICE 402 of the OEM vehicle using an engine coupler 404, e.g., including appropriate gearing and crankshaft spline adaptation. The vehicle battery 412 configured with a desired wight and capacity (kWh) may be coupled to the output of the electric charging motor 406, e.g., through an optional AC/DC converter 408 and a charging controller 410. A battery cooling system, similar to a known transmission cooling system, may be coupled to the vehicle battery 412 to provide thermal management.

The vehicle battery 412 may be coupled to the drive controller 414. The drive controller 414 may be coupled to the user I/O and vehicle data 300, the front 416 and rear 422 electric drive motors. Optionally the drive controller 414 may be coupled to the ICE 402 for providing the ICE control signal and/or the heater 432 for providing the heating control signal.

The front 416 and rear 422 electric drive motors may be coupled to the drive controller 414 and to the front 420 and rear 426 axles, respectively, through the front 418 and rear 424 motor couplers, respectively. The front 416 and rear 422 electric drive motors may include gearing adaptations for driving the front 420 and rear 426 axles and may also include shock/vibration damping. The front 418 and rear 424 motor couplers may be coupled to the OEM front and rear differentials and allow changing from 2WD to 4WD.

To reduce the overall vehicle weight, a fuel tank 403 that is smaller than the OEM fuel tank may be installed for providing fuel for the ICE 402. The fuel tank 403 filler neck may be in the same location as in the OEM vehicle. A known 12-volt lead-acid or lithium-ion battery may be installed to run standard vehicle features, e.g., headlights, etc, or such features can be energized by the vehicle battery 412.

In some embodiments, an electric vehicle (EV) charging system 434 (FIG. 4) may be installed for charging the vehicle battery 412 in a known manner. In some embodiments, the EV charging system 434 may include hot-swappable connections for different chargers and may be configured for charging the vehicle battery 412 using AC and DC inputs. In some embodiments, the EV charging system 434 and its charging connections may be hidden from view to obscure the fact that the vehicle is an electric vehicle.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to electric vehicles. One example of a modular electric vehicle consistent with the present disclosure includes an electric vehicle chassis that includes an energy storage device, chassis control circuitry, and one or more communication interfaces disposed on an upper surface of the chassis. The chassis further includes an electric motor, suspension and drivetrain to provide an operating vehicle. A vehicle body includes one or more communication interfaces corresponding to the one or more communication interfaces disposed on the upper surface of the chassis. The vehicle body is disposed proximate the upper surface of the chassis and the communication interfaces communicatively couple the instrumentation and controls in the vehicle body to the chassis to provide a fully functional, drivable, vehicle having instrumentation, communication, and vehicle operator controls. One or more mechanical connections may also be used to couple the vehicle body to the chassis.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

According to example 1, there is provided a modular electric vehicle chassis. The chassis may include: a frame to receive a vehicle body proximate at least a portion of an upper surface of the frame, the frame including: a central chassis member; a front subframe operably coupled to the central chassis member, the front subframe configured to support a front axle; and a rear subframe operably coupled to the central chassis member opposite the front subframe, the rear subframe configured to support a rear axle. The frame may further include: at least one communication interface to communicatively couple to the vehicle body; at least one energy storage device physically coupled to the frame; at least one physical connector to couple the vehicle body to the frame; at least one electric motor physically coupled to the frame, the at least one electric motor to drive at least one wheel coupled to at least one of the front axle or the rear axle; and chassis control circuitry to: receive one or more input signals from the vehicle body disposed proximate the upper surface of the frame via the at least one communication interface; and communicate one or more output signals to the vehicle body via the at least one communication interface, the one or more output signals including information associated with the at least one energy storage device or data for presentation to an occupant of the vehicle.

Example 2 may include elements of example 1 where a wheelbase includes the distance measured between the front axle and the rear axle; and where the front subframe is slidably coupled to the central chassis member to provide an adjustable wheelbase.

Example 3 may include elements of any of examples 1 or 2 where the rear subframe is slidably coupled to the central chassis member to provide an adjustable wheelbase.

Example 4 may include elements of any of examples 1 through 3 where the front axle comprises a variable width rotatable member to provide a variable track width.

Example 5 may include elements of any of examples 1 through 4 where the rear axle comprises a variable width rotatable member to provide a variable track width.

Example 6 may include elements of any of examples 1 through 5 and the chassis may further include: at least one charging system to transfer energy from a power source external to the chassis to the at least one energy storage device disposed in the chassis.

Example 7 may include elements of any of examples 1 through 6 where the at least one electric motor comprises a first electric motor rotatably coupled to the first axle, and a second electric motor rotatably coupled to the second axle.

Example 8 may include elements of any of examples 1 through 7 where the at least one electric motor comprises a first electric motor rotatably coupled to a first portion of the first axle, a second electric motor rotatably coupled to a second portion of the first axle, a third electric motor rotatably coupled to a first portion of the second axle, and a fourth electric motor rotatably coupled to a second portion of the second axle.

Example 9 may include elements of any of examples 1 through 8 and the chassis may further include: at least one HVAC connection to couple a vehicle HVAC system to the chassis. Example 10 may include elements of any of examples 1 through 9 and the chassis may further include: at least one power connection to provide electrical power to a vehicle body disposed proximate the upper surface of the frame.

According to example 11, there is provided a modular vehicle. The vehicle may include: a vehicle body having a lower surface, the lower surface to accommodate the disposal of an electric vehicle chassis proximate at least a portion of the lower surface of the vehicle body; one or more communication interfaces, the one or more communication interfaces disposed on the lower surface of the vehicle body such that the one or more communication interfaces communicatively coupled to corresponding chassis communication interfaces disposed on an upper surface of the electric vehicle chassis when the vehicle body is disposed proximate the upper surface of the electric vehicle chassis; at least one attachment feature disposed proximate the lower surface of the vehicle body, the at least one attachment feature to operably couple the vehicle body to the electric vehicle chassis; and at least one processor-based device to: receive one or more output signals from the chassis via the at least one communication interface; and communicate one or more output signals to the chassis via the at least one communication interfaces, the one or more output signals including information associated with at least one input provided by an occupant of the vehicle.

Example 12 may include elements of example 11 where the at least one processor-based device to further: autonomously communicate one or more vehicle body operating parameters to chassis control circuitry disposed in the electric vehicle chassis.

Example 13 may include elements of any of examples 11 or 12 where the at least one processor-based device autonomously communicates data representative of at least one of: a wheelbase associated with the vehicle body or a track width associated with the vehicle body to the chassis control circuitry disposed in the electric vehicle chassis.

Example 14 may include elements of any of examples 11 through 13 and the vehicle may further include: at least one HVAC connection disposed on the lower surface of the vehicle body, the at least one HVAC connection to receive at least one of: warm air, cool air, or air conditioned air from the electric vehicle chassis.

Example 15 may include elements of any of examples 11 through 14 and the vehicle may further include: at least one power connection disposed on the lower surface of the vehicle body, the at least one power connection to receive electric power from the electric vehicle chassis.

According to example 16, there is provided an electric vehicle. The vehicle may include: a vehicle body that includes: a lower surface; one or more vehicle body communication interfaces disposed on the lower surface of the vehicle body; at least one attachment feature disposed proximate the lower surface of the vehicle body; and at least one processor-based device; and an electric vehicle chassis including: a frame having an upper surface disposed proximate the lower surface of the vehicle body, the frame being configured to support a front axle and a rear axle; at least one chassis communication interface to communicatively couple to the vehicle body communication interface; at least one energy storage device physically coupled to the frame; at least one physical connector to engage the at least one attachment feature; at least one electric motor physically coupled to the frame, the at least one electric motor to drive at least one wheel coupled to at least one of the front axle or the rear axle; and chassis control circuitry to: receive one or more input signals from the vehicle body via the at least one chassis communication interface and the at least one vehicle body communication interface; and communicate one or more output signals to the vehicle body via the at least one chassis communication interface and the at least one vehicle body communication interface, the one or more output signals including information associated with the at least one energy storage device or data for presentation to an occupant of the vehicle.

Example 17 may include elements of example 16 and the vehicle may further include at least one HVAC connection operably coupling at least one HVAC device disposed in the electric vehicle chassis with the vehicle body.

Example 18 may include elements of any of examples 16 or 17 and the vehicle may further include: at least one power connection operably coupling the at least one energy storage device disposed in the electric vehicle chassis to the vehicle body.

Example 19 may include elements of any of examples 16 through 18 where a wheelbase includes the distance measured between the front axle and the rear axle; and the frame includes: a central chassis member; and a front subframe, the front subframe slidably coupled to the central chassis member to provide a frame having an adjustable wheelbase.

According to example 21, there is provided an electric vehicle. The vehicle includes an internal combustion engine; an electric charging motor; an engine coupler coupling an output of the internal combustion engine to an input of the electric charging motor; a vehicle battery coupled to an output of the electric charging motor, the output of the electric charging motor being configured for charging the vehicle battery or to directly power the drive motors; at least one electric drive motor coupled to an axle of the vehicle for driving the axle of the vehicle; and a controller configured to couple the vehicle battery to the at least one electric drive motor for energizing the at least one electric drive motor for driving the axle of the vehicle.

Example 22 may include elements of claim 21 wherein the internal combustion engine does not provide any drive power to the vehicle.

Example 23 may include elements of examples 21 or 22 wherein the output of the electric charging motor is configured to provide at least 75 kilowatts per hour to the vehicle battery.

Example 24 may include elements of any of examples 21 to 23 wherein the input to the electric charging motor is a rotational input of at least 3600 revolutions per minute (RPM).

Example 25 may include elements of any of examples 21 to 24 wherein the input to the electric charging motor is a rotational input rotated with at least 163 foot-pounds of torque.

Example 26 may include elements of any of examples 21 to 25 wherein the output of the internal combustion engine is a rotational output providing at least 163 foot-pounds of torque at 1200 revolutions per minute (RPM).

Example 27 may include elements of any of examples 21 to 26 wherein the input to the electric charging motor is a rotational input of at least 3600 revolutions per minute (RPM) and provides at least 163 foot-pounds of torque.

Example 28 may include elements of any of examples 21 to 27 wherein the controller is configured to provide an internal combustion engine control signal to the internal combustion engine, and wherein the internal combustion engine is configured to increase its operating revolutions per minute (RPM) in response to the internal combustion engine control signal without providing any drive power to the vehicle.

Example 29 may include elements of example 28 wherein the internal combustion engine control signal is configured to cause the RPM to vary to thereby simulate operation of an internal combustion engine that provides drive power to the vehicle.

Example 30 may include elements of example 28 or 29 wherein the internal combustion engine control signal is configured to vary in response to user operation of a throttle pedal of the vehicle to cause the RPM to vary in response to the throttle pedal.

Example 31 may include elements of any of examples 28 to 30 wherein the controller is configured to provide an internal combustion engine control signal to the internal combustion engine in response to a charge of the vehicle battery, and wherein the internal combustion engine is configured to vary its operating revolutions per minute (RPM) in response to the internal combustion engine control signal.

Example 32 may include elements of any of examples 21 to 31, the vehicle further including a heater, and wherein the controller is configured to provide a heating control signal to the heater, the heater being configured to warm the internal combustion engine in response to the heating control signal.

Example 33 may include elements of any of examples 21 to 32, the vehicle further including a second electric motor coupled to a second axle of the vehicle, and wherein the controller is configured to couple the vehicle battery to the at least one electric drive motor and the second electric motor for driving the axle and the second axle of the vehicle, respectively.

Example 34 may include elements of any of examples 21 to 33 wherein the at least one electric drive motor is coupled to the axle through a motor coupler coupled to a differential of the vehicle.

Example 35 may include elements of any of examples 21 to 34, the vehicle further including a second electric motor coupled to a second axle of the vehicle, and wherein the second electric motor is coupled to the second axle through a second motor coupler coupled to a second differential of the vehicle.

According to example 36, there is provided a method of converting an original equipment manufacturer (OEM) vehicle driven by an internal combustion engine to an electric vehicle driven by a vehicle battery. The method includes: removing a transmission of the OEM vehicle; removing a drive shaft of the OEM vehicle; installing a vehicle battery in the vehicle; installing at least one electric charging motor in the vehicle; installing at least one electric drive motor in the vehicle; coupling the internal combustion engine to the electric charging motor; coupling the electric charging motor to the vehicle battery for charging the vehicle battery; coupling the least one electric drive motor to an axle of the OEM vehicle; and coupling an output of the vehicle battery to the at least one electric charging motor using a controller for energizing the at least one electric drive motor for driving the axle of the vehicle.

Example 37 may include elements of example 36 further including removing a fuel tank of the OEM vehicle and installing a smaller fuel tank in the vehicle, the smaller fuel tank being smaller than the fuel tank of the OEM vehicle.

Example 38 may include elements of any examples 36 or 37 further including installing an electric vehicle charging system in the vehicle for charging the vehicle battery.

Example 39 may include elements of any of examples 36 to 38 wherein the controller is configured to provide an internal combustion engine control signal to the internal combustion engine, and wherein the internal combustion engine is configured to increase its operating revolutions per minute (RPM) in response to the internal combustion engine control signal without providing any drive power to the vehicle.

Example 40 may include elements of any of examples 36 to 39 wherein the internal combustion engine control signal is configured to cause the RPM to vary to thereby simulate operation of an internal combustion engine that provides drive power to the vehicle.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A modular electric vehicle chassis comprising:
   a frame to receive a vehicle body proximate at least a portion of an upper surface of the frame, the frame including:
   a central chassis member,
   a front subframe operably coupled to the central chassis member, the front subframe configured to support a front axle, and
   a rear subframe operably coupled to the central chassis member opposite the front subframe, the rear subframe configured to support a rear axle; wherein at least the front or rear subframe being slidably coupled to the central chassis member;
   at least one communication interface to communicatively couple to the vehicle body;
   at least one energy storage device;
   at least one physical connector to couple the vehicle body to the frame;
   at least one electric motor physically coupled to the frame, the at least one electric motor to drive at least one wheel coupled to at least one of the front axle or the rear axle;
   a wireless electronic device configured to communicate with a chassis control circuitry to provide a wheelbase adjustment signal; and
   the chassis control circuitry to:
   receive one or more input signals from the vehicle body disposed proximate the upper surface of the frame via the at least one communication interface;
   determine a type of vehicle body based on the received one or more input signals; and
   control the front subframe and/or the rear subframe to adjust a wheelbase between the front axle and the rear axle and to adjust the overall size of the frame to receive a variety of vehicle body types, wherein the front subframe and/or the rear subframe is coupled to the central chassis member through a sliding mechanical coupling that is driven by a linear actuator in response to a drive signal to adjust the wheelbase.

2. The chassis of claim 1, further comprising:
   at least one charging system to transfer energy from a power source external to the chassis to the at least one energy storage device disposed in the chassis.

3. The chassis of claim 1 wherein:
   the at least one electric motor comprises
   a first electric motor rotatably coupled to the first axle and
   a second electric motor rotatably coupled to the second axle.

4. The chassis of claim 1 wherein:
   the at least one electric motor comprises
   a first electric motor rotatably coupled to a first portion of the first axle,
   a second electric motor rotatably coupled to a second portion of the first axle,
   a third electric motor rotatably coupled to a first portion of the second axle, and
   a fourth electric motor rotatably coupled to a second portion of the second axle.

5. The chassis of claim 1, further comprising:
   at least one HVAC connection to couple a vehicle HVAC system to the chassis.

6. An electric vehicle comprising:
   an internal combustion engine;
   an electric charging motor;
   an engine coupler coupling an output of the internal combustion engine to an input of the electric charging motor;
   a vehicle battery coupled to an output of the electric charging motor, the output of the electric charging motor being configured for charging the vehicle battery;
   at least one electric drive motor coupled to an axle of the vehicle for driving the axle of the vehicle; and
   a controller configured to:
   couple the vehicle battery to the at least one electric drive motor for energizing the at least one electric drive motor for driving the axle of the vehicle; and
   control a front subframe and/or a rear subframe to adjust a wheelbase between a front axle and a rear axle and to adjust the overall size of a frame to receive a variety of vehicle body types, wherein the front subframe and/or the rear subframe is coupled to a central chassis member through a sliding mechanical coupling that is driven by a linear actuator in response to a drive signal to adjust the wheelbase.

7. An electric vehicle according to claim 6, wherein internal combustion engine does not provide any drive power to the vehicle.

8. An electric vehicle according to claim 6, wherein the output of the electric charging motor is configured to provide at least 75 kilowatts per hour to the vehicle battery.

9. An electric vehicle according to claim 6, wherein the input to the electric charging motor is a rotational input of at least 3600 revolutions per minute (RPM).

10. An electric vehicle according to claim 6, wherein the input to the electric charging motor is a rotational input rotated with at least 163 foot-pounds of torque.

11. An electric vehicle according to claim 6, wherein the output of the internal combustion engine is a rotational output providing at least 163 foot-pounds of torque at 1200 revolutions per minute (RPM).

12. An electric vehicle according to claim 6, wherein the controller is configured to provide an internal combustion engine control signal to the internal combustion engine, and wherein the internal combustion engine is configured to increase its operating revolutions per minute (RPM) in response to the internal combustion engine control signal without providing any drive power to the vehicle.

13. An electric vehicle according to claim 12, wherein the internal combustion engine control signal is configured to cause the RPM to vary to thereby simulate operation of an internal combustion engine that provides drive power to the vehicle.

14. An electric vehicle according to claim 12, wherein the internal combustion engine control signal is configured to vary in response to user operation of a throttle pedal of the vehicle to cause the RPM to vary in response to the throttle pedal.

15. An electric vehicle according to claim 6, wherein the controller is configured to provide an internal combustion engine control signal to the internal combustion engine in response to a charge of the vehicle battery, and wherein the internal combustion engine is configured to vary its operating revolutions per minute (RPM) in response to the internal combustion engine control signal.

16. An electric vehicle according to claim 6, the vehicle further comprising a second electric motor coupled to a second axle of the vehicle, and wherein the controller is configured to couple the vehicle battery to the at least one electric drive motor and the second electric motor for driving the axle and the second axle of the vehicle, respectively.

17. A method of converting an original equipment manufacturer (OEM) vehicle driven by an internal combustion engine to an electric vehicle driven by a vehicle battery, the method comprising:
- removing a transmission of the OEM vehicle;
- removing a drive shaft of the OEM vehicle;
- adjust a wheelbase between a front axle and a rear axle to adjust an overall size of a frame of the OEM vehicle to receive an electric vehicle body, wherein a front subframe and/or a rear subframe is coupled to a central chassis member through a sliding mechanical coupling that is driven by a linear actuator in response to a drive signal to adjust the wheelbase;
- installing a vehicle battery in the vehicle;
- installing at least one electric charging motor in the vehicle;
- installing at least one electric drive motor in the vehicle;
- coupling the internal combustion engine to the electric charging motor;
- coupling the electric charging motor to the vehicle battery for charging the vehicle battery;
- coupling the least one electric drive motor to an axle of the OEM vehicle; and
- coupling an output of the vehicle battery to the at least one electric charging motor using a controller for energizing the at least one electric drive motor for driving the axle of the vehicle.

18. A method according to claim 17, wherein the controller is configured to provide an internal combustion engine control signal to the internal combustion engine, and wherein the internal combustion engine is configured to increase its operating revolutions per minute (RPM) in response to the internal combustion engine control signal without providing any drive power to the vehicle.

19. The chassis of claim 1, wherein the chassis control circuitry is further configured to communicate one or more output signals to the vehicle body via the at least one communication interface.

20. The chassis of claim 1, wherein the chassis control circuitry is further configured to receive electronic communication from an external control device.

21. The chassis of claim 1, wherein the rear subframe is slidably coupled to the central chassis member via an actuator to provide the adjustable wheelbase; and wherein in response to the received electronic communication, the control circuitry provides a drive signal to the actuator to adjust the wheelbase.

22. The chassis of claim 1, further comprising one or more position sensors coupled to the frame and configured to indicate when a desired wheelbase is achieved.

23. The chassis of claim 1, further comprising a variable width front drivetrain coupled to the front subframe and the front axle, wherein a track width may be adjusted based on the width of the vehicle body.

24. The chassis of claim 1, further comprising a variable width rear drivetrain coupled to the rear subframe and the rear axle, wherein a track width may be adjusted based on the width of the vehicle body.

25. The chassis of claim 1, wherein the wheelbase is autonomously adjusted by the chassis control circuitry based on the wheelbase of the vehicle body to be mounted to the electric vehicle chassis.

* * * * *